(12) United States Patent
Vidano et al.

(10) Patent No.: US 11,643,055 B2
(45) Date of Patent: May 9, 2023

(54) RAPID DECELERATION MECHANISM FOR A VEHICLE

(71) Applicant: Nuro, Inc., Mountain View, CA (US)

(72) Inventors: Trevor Andrew Vidano, Sacramento, CA (US); Daniel Jason Ratner, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 312 days.

(21) Appl. No.: 16/996,096

(22) Filed: Aug. 18, 2020

(65) Prior Publication Data

US 2021/0129806 A1    May 6, 2021

Related U.S. Application Data

(60) Provisional application No. 62/930,679, filed on Nov. 5, 2019.

(51) Int. Cl.
*B60T 1/14*    (2006.01)

(52) U.S. Cl.
CPC ..................... *B60T 1/14* (2013.01)

(58) Field of Classification Search
CPC .................................. B60T 1/14; B60T 1/00
USPC ......................................................... 188/32
See application file for complete search history.

(56) References Cited

U.S. PATENT DOCUMENTS

| 2,300,725 | A | * | 11/1942 | Cieri | B60T 1/14 |
| | | | | | 188/5 |
| 3,605,954 | A | * | 9/1971 | Wakabayashi | B60T 1/14 |
| | | | | | 188/4 R |
| 4,066,151 | A | | 1/1978 | Liebscher et al. | |
| 4,265,338 | A | | 5/1981 | Shea et al. | |
| 4,317,507 | A | | 3/1982 | McMillan | |
| 5,439,076 | A | | 8/1995 | Percy, Jr. | |
| 5,444,949 | A | | 8/1995 | Ciaccio | |
| 9,487,190 | B1 | | 11/2016 | Alvarado | |
| 10,369,976 | B1 | | 8/2019 | Ratner | |
| 2008/0136133 | A1 | | 6/2008 | Takahashi | |
| 2010/0084426 | A1 | | 4/2010 | Devers et al. | |
| 2011/0017538 | A1 | | 1/2011 | Baumann | |
| 2011/0155496 | A1 | | 6/2011 | Baumann | |
| 2011/0198161 | A1 | | 8/2011 | Lomazzo | |
| 2013/0037355 | A1 | | 2/2013 | Baker et al. | |

(Continued)

FOREIGN PATENT DOCUMENTS

| CN | 107199996 | A | * | 9/2017 |
| DE | 3437402 | A1 | * | 4/1986 |

(Continued)

*Primary Examiner* — Melanie Torres Williams
(74) *Attorney, Agent, or Firm* — Edell, Shapiro & Finnan, LLC

(57) ABSTRACT

A rapid deceleration mechanism for a vehicle is provided herein. The rapid deceleration mechanism includes a cutting mechanism configured to be coupled to a body of the vehicle, e.g., via a tether. An actuating mechanism is configured to selectively actuate (e.g., release or propel) the cutting mechanism towards a road surface on which the vehicle is driving to cause the cutting mechanism to cut a channel in the road surface. The channel defines a bollard area in the road surface. At least a portion of the cutting mechanism is disposed at least partially within the channel, against the bollard area, to anchor the body of the vehicle relative to the road surface.

20 Claims, 11 Drawing Sheets

(56) References Cited

U.S. PATENT DOCUMENTS

| | | |
|---|---|---|
| 2014/0081445 A1 | 3/2014 | Villamar |
| 2014/0191078 A1 | 7/2014 | Boren |
| 2015/0006005 A1 | 1/2015 | Yu et al. |
| 2017/0101095 A1 | 4/2017 | Nilsson |
| 2017/0174343 A1 | 6/2017 | Erickson et al. |
| 2019/0210595 A1* | 7/2019 | Cheaz .................. B60W 40/06 |
| 2019/0263365 A1 | 8/2019 | Krasnoff |

FOREIGN PATENT DOCUMENTS

| | | |
|---|---|---|
| DE | 3437402 A1 | 4/1986 |
| DE | 102005009949 A1 | 9/2006 |
| KR | 1020040009046 A * | 1/2004 |
| WO | 2017117303 A1 | 7/2017 |

* cited by examiner

RAPID DECELERATION MECHANISM FOR A VEHICLE

CROSS REFERENCE TO RELATED APPLICATION

This application claims priority to U.S. Provisional Patent Application No. 62/930,679, titled "Method and Apparatus for Providing a Pavement Bollard Anchor to Decelerate a Vehicle," filed Nov. 5, 2019, the entirety of which is incorporated herein by reference.

TECHNICAL FIELD

The disclosure relates generally to rapidly decelerating a vehicle.

BACKGROUND

Vehicles in motion often need to stop as quickly as possible. For example, when a pedestrian crosses a roadway directly in a path of a moving vehicle, the vehicle generally must either take evasive measures or come to a fast stop to avoid striking the pedestrian. In many instances, it may not be possible for the vehicle to swerve or stop fast enough to avoid a collision.

DESCRIPTION OF EXAMPLE EMBODIMENTS

Overview

Figure 1:
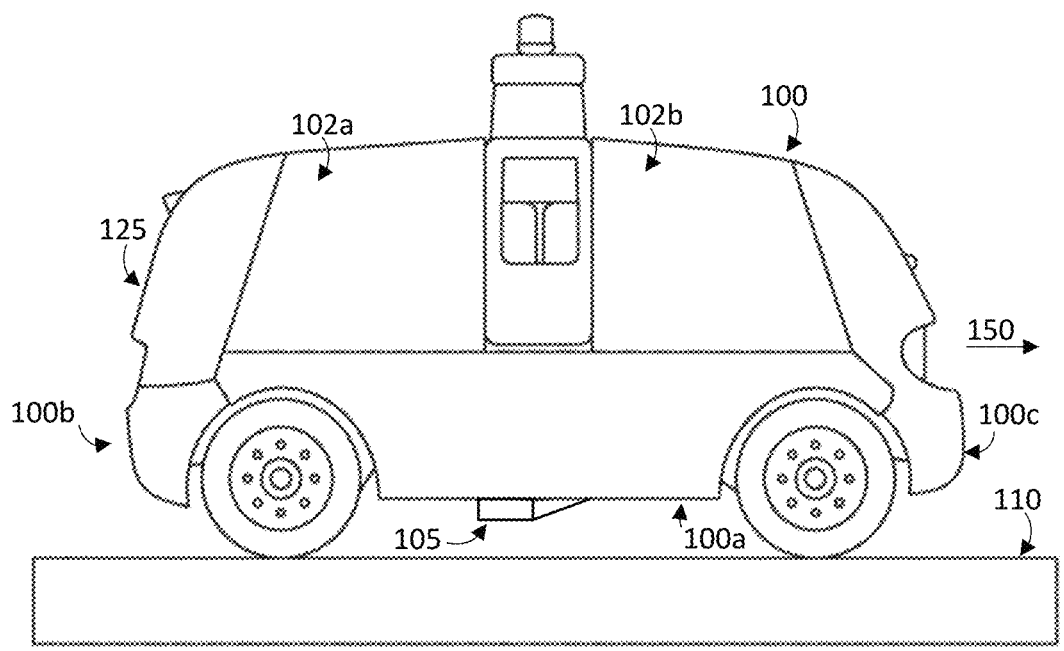
FIG. 1 is a side view of a vehicle having a rapid deceleration mechanism, which is in an undeployed state, according to an example embodiment.

In one embodiment, a rapid deceleration mechanism for a vehicle is provided. The rapid deceleration mechanism includes a cutting mechanism configured to be coupled to a body of the vehicle, e.g., via a tether. An actuating mechanism is configured to selectively actuate (e.g., release or propel) the cutting mechanism towards a road surface on which the vehicle is driving to cause the cutting mechanism to cut a channel in the road surface. The channel defines a bollard area in the road surface. At least a portion of the cutting mechanism is disposed at least partially within the channel, against the bollard area, to anchor the body of the vehicle relative to the road surface.

Example Embodiments

Vehicles generally come equipped with braking systems that are configured to inhibit motion to slow or stop the vehicles. In certain situations, it may be necessary for a vehicle to stop more quickly than can be accomplished by its braking system. For example, if a pedestrian or other obstacle suddenly enters an immediate path of a moving vehicle, the vehicle's braking system may not be adequate to prevent the vehicle from colliding with the obstacle.

Providing a rapid deceleration mechanism for use when a braking system is expected to be inadequate may increase the chances of averting a collision or other hazard. For example, the rapid deceleration mechanism may be deployed in lieu of, or in addition to, the vehicle's regular braking system, as a "last chance" or "emergency fail-safe." In some instances, e.g., if the vehicle is autonomous or unmanned, the rapid deceleration mechanism may operate to avoid the hazard and/or stop the vehicle without care for the well-being of the vehicle.

According to an example embodiment, the rapid deceleration mechanism can be deployed when conditions indicate that the braking system of the vehicle is inadequate to perform a desired deceleration. Such conditions may include, but are not limited to, a speed at which the vehicle is traveling; a current distance between the vehicle and an anticipated location of a hazard, such as a collision with an obstacle; and/or a speed at which an obstacle is traveling (if any). For example, the rapid deceleration mechanism may be deployed if a collision is perceived to be imminent and it is determined that the braking system is inadequate to avoid the collision.

The rapid deceleration mechanism may be configured to alter a road surface on which the vehicle is traveling. For example, the rapid deceleration mechanism can include a cutting mechanism and tether arranged to create a bollard anchor in the road surface. The cutting mechanism can create a channel into which at least a portion of the cutting mechanism and/or tether can be inserted to anchor the vehicle to the road surface, as more fully described below.

Example embodiments that may be used to implement the features and functionality of this disclosure will now be described with more particular reference to the accompanying figures. While like reference numerals represent like elements throughout the several figures for purposes of simplicity and clarity, repetition of reference numerals does not itself dictate a relationship between the various embodiments and/or configurations discussed. In addition, while reference may be made to the spatial relationships between various components and to the spatial orientation of various aspects of components as depicted in the attached drawings, as will be recognized by those skilled in the art after a complete reading of the present disclosure, the devices, components, members, apparatuses, etc. described herein may be positioned in any desired orientation. Thus, the use of terms such as "top," "bottom," "front," "back," "left," "right," "above," "under," "over," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Similarly, when used herein, the term "comprises" and its derivations (such as "comprising", etc.) should not be understood in an excluding sense, that is, these terms should not be interpreted as excluding the possibility that what is described and defined may include further elements, steps, etc. Further, each example embodiment described herein as illustrative and is not to be construed as a preferred or advantageous embodiment, but rather as one example or illustration of a possible embodiment.

Figure 2:
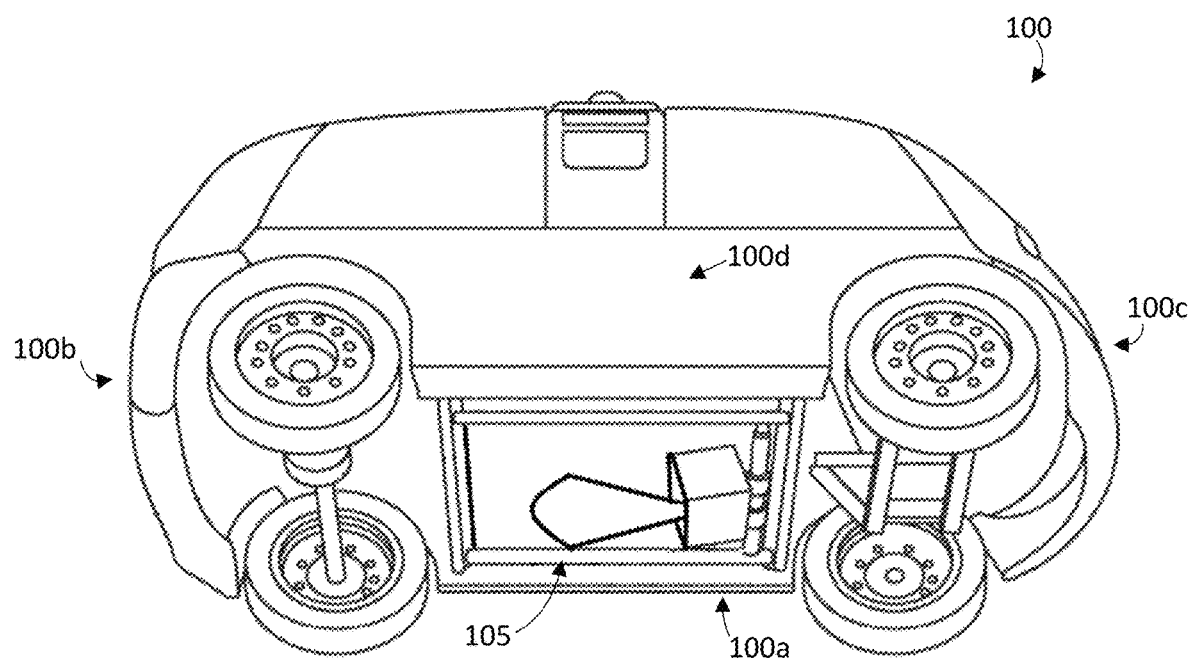
FIG. 2 is a bottom perspective view of the vehicle as shown in FIG. 1, with portions thereof removed for clarity, according to an example embodiment.
Figure 3:
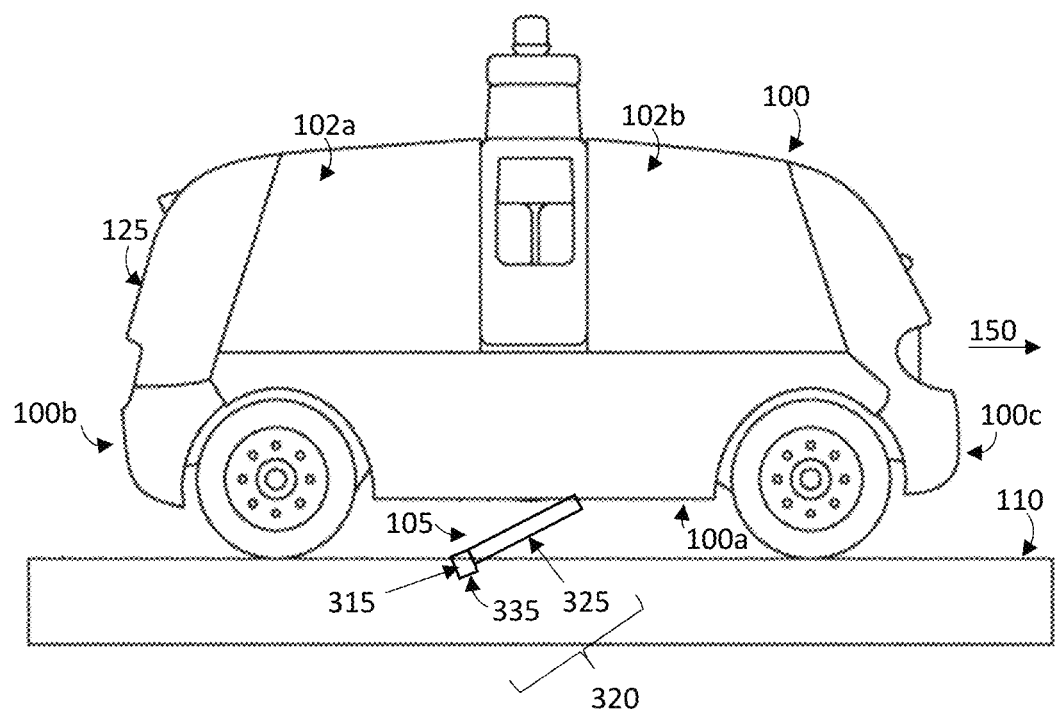
FIG. 3 is a side view of the vehicle of FIG. 1, where the rapid deceleration mechanism is in a deployed state, according to an example embodiment.

Referring initially to FIGS. 1-3, a vehicle 100 can include a rapid deceleration mechanism 105, which is movable between an undeployed state (FIGS. 1 and 2) and a deployed state (FIG. 3) to selectively limit movement of the vehicle 100 relative to a road surface 110 (e.g., for rapid stopping, turning, etc.). The vehicle 100 is any manned or unmanned mobile machine configured to transport people, cargo, or other items, whether on land or water, air, or another surface, such as a car, wagon, van, tricycle, truck, bus, trailer, train, tram, ship, boat, ferry, drove, hovercraft, aircraft, etc. The road surface 110 is any surface on which a vehicle (e.g., vehicle 100) or other object may be conveyed. For example, the road surface 110 can include asphalt, concrete, brick, stone, dirt, wood, metal, etc., and can include, e.g., highways, paths, sidewalks, driveways, walkways, back roads, bridges, tunnels, parking lots, ramps, garages, etc.

The vehicle 100 may be operated by a person or may be unmanned. For example, the vehicle 100 may be fully or partially autonomous such that the vehicle can travel in a controlled manner for a period of time without human intervention. In an example embodiment, the vehicle 100 is part of a fleet of autonomous vehicles (e.g., vehicle robots), which are generally arranged to transport and/or deliver cargo, goods, and/or other items. A fleet management module (not shown) can track and dispatch the vehicles (including vehicle 100) for purposes of transporting, delivering, and/or retrieving goods and/or services. The fleet can operate in an unstructured open environment or a closed environment.

In an example embodiment, the vehicle 100 is relatively narrow (e.g., approximately two to approximately five feet wide), with a relatively low mass and low center of gravity for stability. The vehicle 100 may be arranged to have a moderate working speed or velocity range of between approximately one and approximately forty-five miles per hour ("mph"), e.g., approximately twenty-five mph, to accommodate inner-city and residential driving speeds. In addition, the vehicle 100 may have a substantially maximum speed or velocity in a range of between approximately thirty and approximately ninety mph, which may accommodate, e.g., high speed, intrastate or interstate driving. As would be recognized by a person of ordinary skill in the art, these vehicle size, configuration, and speed/velocity ranges are illustrative and should not be construed as being limiting in any way.

The vehicle 100 includes multiple compartments (e.g., compartments 102a and 102b), which may be assignable to one or more entities, such as one or more customers, retailers, and/or vendors. The compartments are generally arranged to contain cargo, goods, and/or other items. In an example embodiment, one or more of the compartments may be secure compartments. It should be appreciated that the number, size, and configuration of the compartments may vary. For example, while two compartments (102a, 102b) are shown, the vehicle 100 may have more than two or less than two (e.g., zero or one) compartments.

For example, the vehicle 100 can travel on the road surface 110 along a path in a direction 150. The rapid deceleration mechanism 105 is configured to be selectively deployed in lieu of, or in addition to, a regular braking system of the vehicle 100, to substantially prevent the vehicle 100 from further travel in the direction 150 and/or cause the vehicle 100 to turn rapidly in a desired direction away from direction 150. For example, the rapid deceleration mechanism 105 may be deployed when the braking system is expected to be inadequate to achieve a desired deceleration.

In an example embodiment, the rapid deceleration mechanism 105 is configured to alter the road surface 110 to enable the vehicle 100 to be anchored to the road surface 110. For example, as shown in FIG. 3, the rapid deceleration mechanism 105 can include a cutting mechanism 315 and tether 325 arranged to create a bollard anchor 320 in the road surface 110. In particular, the cutting mechanism 315 can create a channel 335 into which at least a portion of the cutting mechanism 315 and/or tether 325 can be inserted to define the bollard anchor 320. The bollard anchor 320 can substantially prevent the vehicle 100 from further travel in the direction 150 and/or cause the vehicle 100 to turn rapidly in a desired direction away from direction 150.

The rapid deceleration mechanism 105 is mounted on, or integrally formed with, a body 125 of the vehicle. For example, as shown in FIGS. 1-3, the rapid deceleration mechanism 105 may be mounted on a bottom side 100a of the vehicle 100, e.g., underneath or within a chassis of the vehicle 100, such that the rapid deceleration mechanism 105 is positioned substantially over the road surface 110. In an example embodiment, the rapid deceleration mechanism 105 may be provided in a kit or independent form for separate attachment to the body 125 (e.g., the chassis) of the vehicle 100. For example, the kit may be mounted using any suitable mechanism or method, e.g., using screws, bolts, and/or other fasteners. Alternatively, the rapid deceleration mechanism 105 may be integrally formed with the body 125 (e.g., the chassis) of the vehicle.

As would be recognized by a person of ordinary skill in the art, the location and configuration of the rapid deceleration mechanism 105 is illustrative and should not be construed as being limiting in any way. For example, in an alternative example embodiment, the rapid deceleration mechanism 105 may be located on a back end 100b of the vehicle 100, a front end 100c of the vehicle 100, a left side (not shown) of the vehicle 100, a right side 100d of the vehicle 100, or another suitable location on the vehicle 100.

Additionally, although FIGS. 1-3 illustrate a single rapid deceleration mechanism 105, it should be understood that the vehicle 100 may include multiple rapid deceleration mechanisms 105. For example, the vehicle 100 can include one or more rapid deceleration mechanisms 105 on the bottom side 100a, one or more rapid deceleration mechanisms 105 on the back end 100b, one or more rapid deceleration mechanisms 105 on the front end 100c, one or more rapid deceleration mechanisms 105 on the left side, and/or one or more rapid deceleration mechanisms 105 on the right side 100d. All of the rapid deceleration mechanisms 105 can be deployed simultaneously or they can be deployed selectively on an as needed basis such that only those rapid deceleration mechanisms 105 that are needed to complete the desired deceleration activity (e.g., a turn and/or a stop) are deployed. For example, one or more rapid deceleration mechanisms 105 may be deployed simultaneously and/or selectively to effectuate turning and/or swerving of the vehicle 100 in one or more directions to help avoid hazards (e.g., objects detected by one or more sensors of the vehicle 100 and/or the presence of which is communicated to the vehicle 100).

Figure 4:
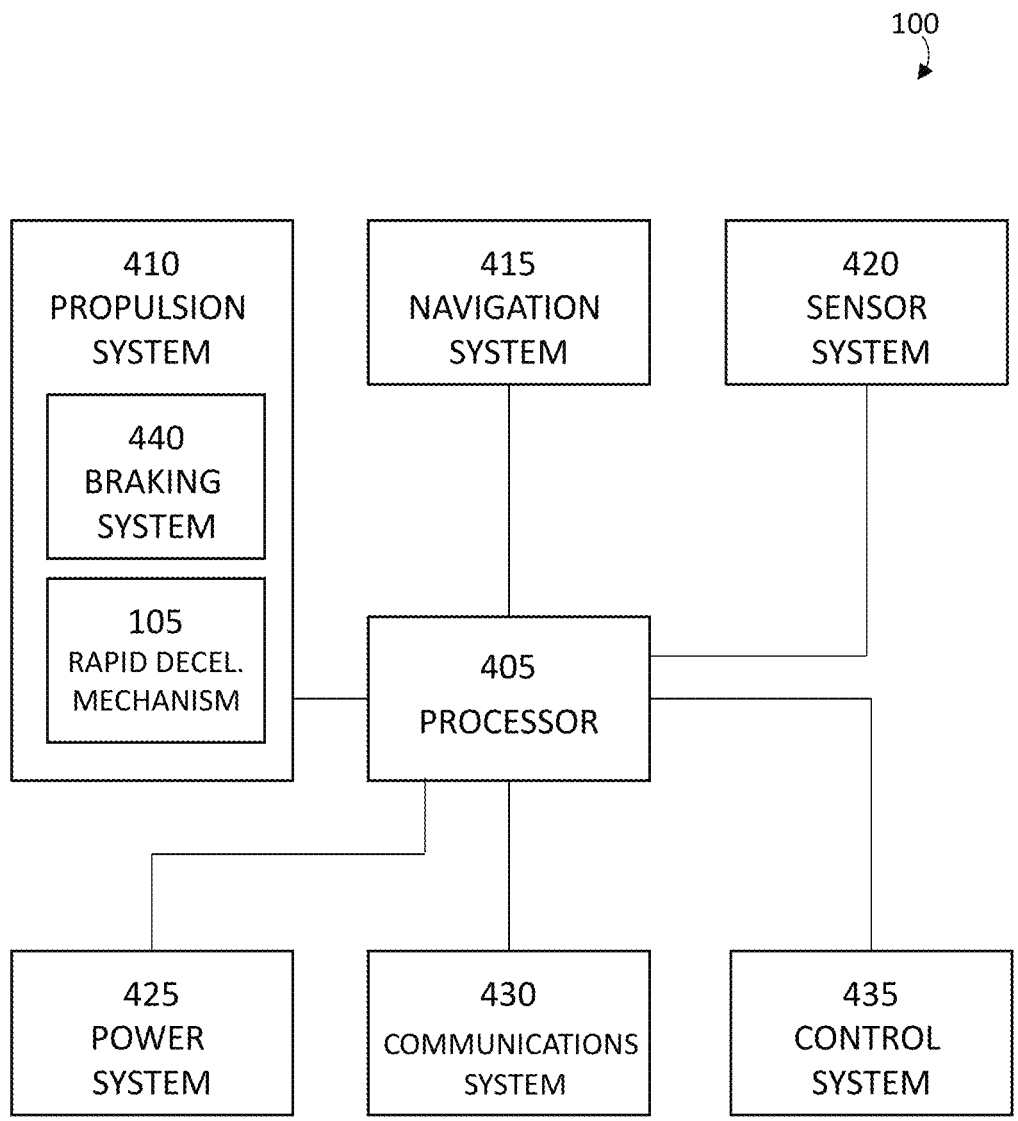
FIG. 4 is a block diagram representation of certain components of a vehicle having a rapid deceleration mechanism, according to an example embodiment.

FIG. 4 is a block diagram representation of certain components of the vehicle 100, according to an example embodiment. With reference to FIGS. 1-4, the vehicle 100 includes a processor 405, which is operatively coupled to, and configured to send instructions to receive instructions from or for, various systems of the vehicle 100, including: a propulsion system 410, a navigation system 415, a sensor system 420, a power system 425, a communications system 430, and a control system 435. The processor 405 and systems are operatively coupled to, or integrated with, a body 125 (FIG. 1) of the vehicle 100 and generally cooperate to operate the vehicle 100.

The propulsion system 410 includes components configured to drive (e.g., move or otherwise convey) the vehicle 100. For example, the propulsion system 410 can include an engine, wheels, steering, and a braking system 440, which cooperate to drive the vehicle 100. In an example embodiment, the engine may be a gas engine, a turbine engine, an electric motor, and/or a hybrid gas/electric engine. As would be appreciated by a person of ordinary skill in the art, the propulsion system 410 may include additional or different components suitable or desirable for conveying an object, such as one or more axles, treads, wings, rotors, blowers, rockets, propellers, and/or other components. Although the vehicle 100 shown in FIGS. 1-3 has a 4-wheeled, 2-axle automotive configuration, this configuration is illustrative and should not be construed as being limiting in any way. For example, the vehicle 100 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

The braking system 440 may be arranged as a "primary" brake for decelerating and/or stopping the vehicle 100. In an example embodiment, the braking system 440 may be configured to decelerate the vehicle 100 at a rate of speed proportional to a mass of the vehicle 100 times the square of its velocity. For example, if the vehicle 100 is traveling at 25 mph, the braking system 440 may be configured to stop the vehicle 100 over about 55 feet. As would be recognized by a person of ordinary skill in the art, the actual braking distance and rate of deceleration may vary, e.g., based on road conditions, tire conditions, a slope of the road surface 110, etc.

In certain situations, there may be a need to stop the vehicle 100 more rapidly than can be accomplished by the braking system 440. The propulsion system 410 includes the rapid deceleration mechanism 105, which is arranged to supplement or replace the braking system 440 as needed to achieve the desired deceleration. For example, the rapid deceleration mechanism 105 may be deployed to rapidly stop and/or turn the vehicle 100 in response to a determination that the braking system 440 is inadequate to avoid an impending hazard such as a collision. For example, if the vehicle 100 is traveling at 25 mph (or 11 m/s), the rapid deceleration mechanism 105 may be configured to stop the vehicle 100 over about 1 meter.

The navigation system 415 can be configured to control the propulsion system 410 and/or provide guidance to an operator associated with the vehicle 100 to navigate the vehicle 100 through paths and/or within unstructured open or closed environments. The navigation system 415 may include, e.g., digital maps, street view photographs, and/or a global positioning system ("GPS") point. For example, the navigation system 415 may cause the vehicle 100 to navigate through an environment based on information in the digital maps and information from sensors included in the sensor system 420.

The sensor system 420 includes one or more sensors configured to view and/or monitor conditions on or around the vehicle 100. For example, the sensors can ascertain when there are objects near the vehicle 100 to enable the vehicle 100 to safely guide the vehicle 100 (via the navigation system 415) around the objects. The sensors may include, e.g., cameras (e.g., running at a high frame rate, akin to video), light detection and ranging ("LiDAR"), radar, ultrasonic sensors, microphones, altimeters, etc. In an example embodiment, the sensor system 420 includes propulsion system sensors that monitor drive mechanism performance, drive train performance, and/or power system levels.

The power system 425 is arranged to provide power to the vehicle 100. Power may be provided as electrical power, gas power, or any other suitable power, e.g., solar power or battery power. In an example embodiment, the power system 425 may include a main power source and an auxiliary power source configured to power various components of the vehicle 100 and/or to generally provide power to the vehicle 100 when the main power source does not have the capacity to provide sufficient power.

The communications system 430 is arranged to enable communication between the vehicle 100 and an external person or device. In an example embodiment, the communications system 430 can communicate wirelessly (e.g., via a Wi-Fi® wireless local area network connection and/or a cellular connection) with a fleet management system, which is arranged to control the vehicle 100 from a remote location. For example, the communications system 430 can generally obtain or receive data, store the data, and transmit or provide the data to the fleet management system and/or to one or more other vehicles within a fleet. The data may include, but is not limited to including, information relating to scheduled requests or orders, information relating to on-demand requests or orders, and/or information relating to a need for the vehicle 100 to reposition itself, e.g., in response to an anticipated demand.

In an example embodiment, the communications system 430 is configured to send a notification to an external system, e.g., a system of a highway patrol, department of transportation, fleet manager, customer, repair shop, base, roadworks management agency, or other person or entity, prior to, immediately after, or simultaneously with, deployment of the rapid deceleration mechanism 105. For example, the notification may include GPS coordinates of the vehicle 100, and/or a bollard anchor 320 (FIG. 3) created upon deployment of the rapid deceleration mechanism 105, to alert an emergency service (e.g., police, medical, fire) or one of the persons or entities listed above about the deployment event, the location of the deployment event, etc. so that any appropriate remediation measures for repairing the road surface 110 (e.g., to fill in a channel 335 (FIG. 3) created by the rapid deceleration mechanism 105) may be initiated.

In an example embodiment, the control system 435 may cooperate with the processor 405 and each of the other systems in the vehicle 100, including the propulsion system 410, the navigation system 415, the sensor system 420, the power system 425, and the communications system 430, to control operation of the vehicle 100. For example, the control system 435 may cooperate with the processor 405 and the other systems to determine where the vehicle 100 may safely travel and to detect (e.g., based on data from the sensor system 420 and/or from an external system (not shown) communicating with the vehicle 100 via the communications system 430), and navigate around, objects in a vicinity around the vehicle 100. In other words, the control system 435 may cooperate with the processor 405 and other systems to effectively determine and facilitate what the vehicle 100 may do within its immediate surroundings. For example, the control system 435 in cooperation with the processor 405 may essentially control the power system 425 and/or the navigation system 415 as part of driving or conveying the vehicle 100. Additionally, the control system 435 may cooperate with the processor 405 and communications system 430 to provide data to or obtain data from other vehicles 100, a management server, a GPS, a personal computer, a teleoperations system, a smartphone, or any other computing device via the communications system 430.

According to an example embodiment, upon a determination that the braking system 440 is inadequate to achieve a desired deceleration, the control system 435 in cooperation with the processor 405 may cause the propulsion system 410 to deploy the rapid deceleration mechanism 105 in lieu of, or in addition to, deploying the braking system 440. Although deployment of the rapid deceleration mechanism 105 generally is described herein as an automated process initiated and/or controlled by the control system 435, it should be understood that deployment also may be initiated manually, e.g., by an operator located within the vehicle 100 or an operator or system located externally from the vehicle 100.

Figure 5:
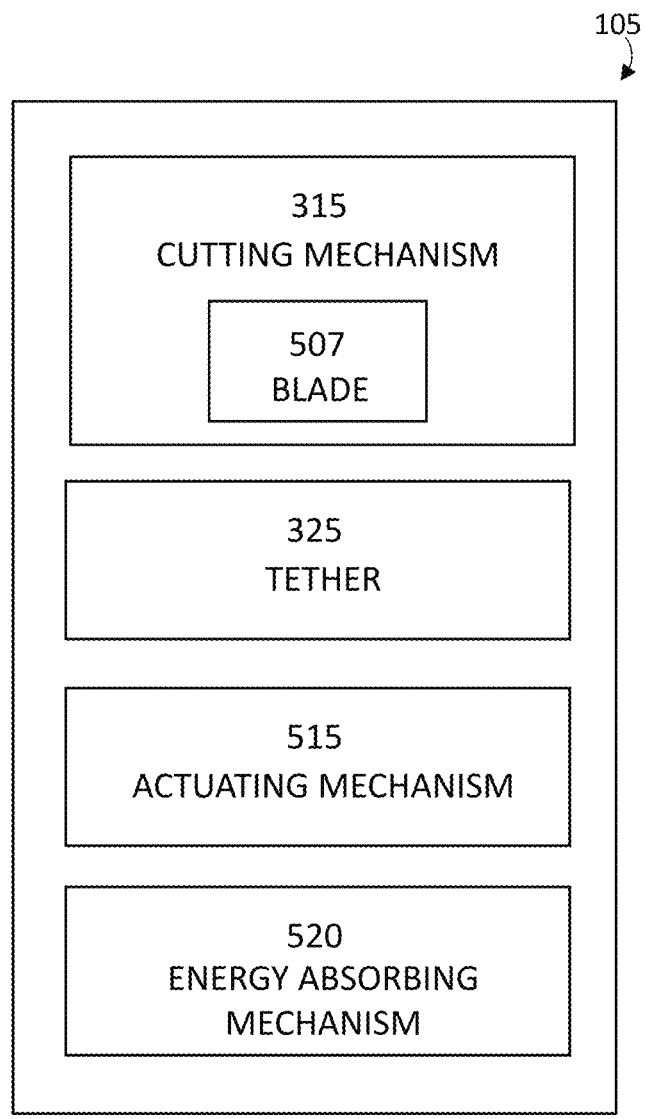
FIG. 5 is a block diagram representation of a rapid deceleration mechanism, according to an example embodiment.

FIG. 5 is a block diagram representation of the rapid deceleration mechanism 105, according to an example embodiment. The rapid deceleration mechanism 105 includes the cutting mechanism 315, the tether 325, an actuating mechanism 515, and an energy absorbing mechanism 520. The rapid deceleration mechanism 105 is coupled to, or integrated with, the body of a vehicle (e.g., vehicle 100) and is generally operable to cause the vehicle to decelerate relative to a surface on which the vehicle is traveling (e.g., the road surface 110 described above).

The cutting mechanism 315 includes a blade 507. An edge of the blade 507 is configured to make initial contact with a surface, such as the road surface 110, to thereby cut into the surface. For example, the blade 507 can include a knife, razor, or saw blade, which may be formed from steel (e.g., carbon steel, stainless steel, tool steel, or alloy steel) or one or more other metals, stones, ceramics, alloys, and/or other materials.

The tether 325 is a rope, strap, or other elongated member. The tether 325 may be formed from any suitable material, such as a metallic material, polymeric material, filaments, fabric, chain, rope, leather, cabling, wires, etc. In an example embodiment, the material is substantially elastic and/or ductile and may be resistant to stretching.

The rapid deceleration mechanism 105 includes an actuating mechanism 515 that is configured to cause the cutting mechanism 315 to be deployed. The actuating mechanism 515 may include, e.g., one or more powered drivers configured to effectively propel the cutting mechanism 315 towards a road surface (e.g., the road surface 110) on which the vehicle is moving, thereby causing the cutting mechanism 315 to cut into the road surface. For example, the actuating mechanism 515 may include a pyrotechnic telescoping device or other mechanism, which may be selectively activated to cause the cutting mechanism 315 to be propelled toward the road surface. An example of actuating mechanism 515 is described in more detail below with reference to FIGS. 12 and 13.

In an example embodiment, when the cutting mechanism 315 cuts into the road surface, a channel, e.g., a ditch or a divot, is formed in the road surface. At least a portion of the cutting mechanism 315 and/or the proximal end of the tether 325 can be disposed at least partially within the channel, anchoring the cutting mechanism 315 and tether 325 to the road surface. The distal end of the tether 325 can remain coupled to the body of the vehicle such that the (anchored) cutting mechanism 315 remains coupled to the vehicle. Thus, the cutting mechanism 315 and tether 325 can cooperate to effectively anchor the vehicle to the road surface.

Once the cutting mechanism 315 cuts the channel into the road surface, the tether 325 can generally transfer the force of stopping the vehicle into the road surface. The rapid deceleration mechanism 105 includes an energy absorbing mechanism 520, which is configured to dissipate certain energy, e.g., kinetic energy, that is generated when the cutting mechanism 315 is deployed to stop the vehicle. For example, the energy absorbing mechanism 520 can include one or more hydraulic shocks, disc brakes, dampers, springs, shape memory material (e.g., nitinol), dashpots, and/or other structures that are designed to absorb shock loads, e.g., via collapsing, crumpling, and/or expanding. For example, the energy absorbing mechanism 520 can include collapsible material that may permanently or temporarily collapse (e.g., crumple) upon receiving a threshold force. In an example embodiment, the energy absorbing mechanism 520 is disposed within a housing to which, or within which, the tether 325 is coupled, as described in more detail with respect to FIGS. 12 and 13.

Figure 6:
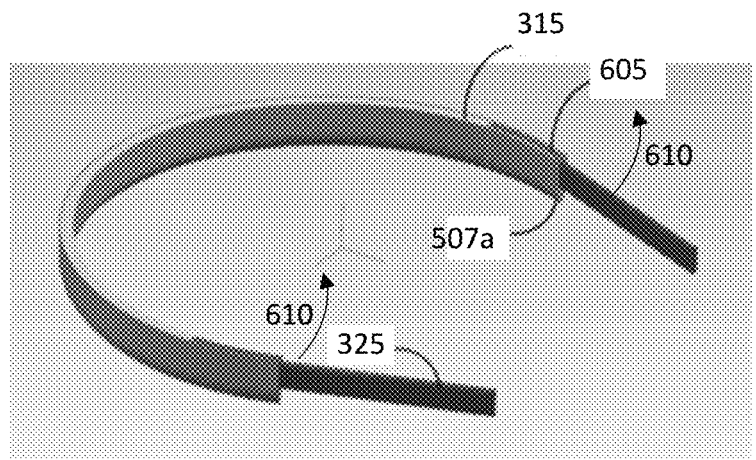
FIG. 6 is a three-dimensional representation of a cutting mechanism and a tether of a rapid deceleration mechanism, according to an example embodiment.
Figure 7:
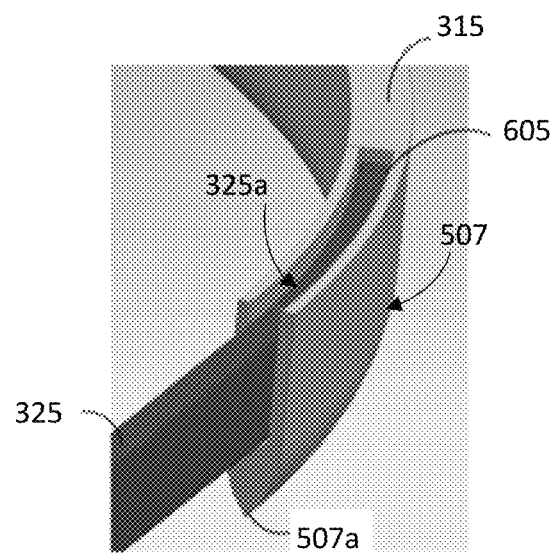
FIG. 7 is a close-up view of a portion of a cutting mechanism and a tether of a rapid deceleration mechanism, according to an example embodiment.

Turning to FIGS. 6 and 7, example features of the cutting mechanism 315 and tether 325 are now described in more detail. As shown in FIGS. 1-3, the cutting mechanism 315 and tether 325 may be mounted to, or integrated with, a vehicle, e.g., vehicle 100, as part of a rapid deceleration mechanism of the vehicle. The complete rapid deceleration mechanism and a vehicle are not shown in FIGS. 6 and 7 for ease of illustration.

The cutting mechanism 315 includes the blade 507 having a blade edge 507a that is configured to be relatively sharp such that the cutting mechanism 315 may cut into a surface such as a road surface. A profile of the blade 507, that is, a shape of the blade 507 when viewed from the side, and a grind of the blade 507, i.e., a cross-sectional shape of the blade in a plane normal to the blade edge 507a, may vary. For example, the blade 507 may have a hollow grind, a flat grind, a sabre grind, a chisel grind, a compound bevel, a convex grind, an asymmetrical grind, or another grind. The blade edge 507a may be serrated or non-serrated. For example, the blade edge 507a may include one or more "teeth" to help grip or slice into the road surface.

An opening 605 (e.g., a cut or slot) in the cutting mechanism 315 is arranged to allow the tether 325 to be carried by the cutting mechanism 315. For example, a portion of a top of the cutting mechanism 315 may be removed to define the opening 605. In an example embodiment, a proximal end 325a ("proximal" relative to the cutting mechanism 315) of the tether 325 is disposed within the opening 605 and pivotable in an upwards direction, e.g., in a direction substantially away from the road surface (not shown) as shown by arrows 610 with respect to the opening 605 defined in the cutting mechanism 315.

As best shown in FIG. 7, the proximal end 325a of the tether 325 is coupled to, or formed with, the cutting mechanism 315. A distal end of the tether 325 (not shown in FIG. 7) is coupled to, or formed with, the body of the vehicle, e.g., a chassis of the vehicle. The proximal end 325a of the tether 325 may be coupled to or formed with the cutting mechanism 315, via any suitable fastening techniques or engagements, such as one or more loops formed within the tether 325 and/or via one or more rings, shackles, spools, pins, cross-members, welding, crimping, adhesion, friction fit, straps, latches, buttons, fasteners, bayonet-type connections and the like, or combinations thereof.

In an example embodiment, the cutting mechanism 315 has a semicircular shape with a diameter in a range of between approximately one meter and approximately 1.5 meters and a depth between about 3 inches and 6 inches. As would be appreciated by a person of ordinary skill in the art, the shape and size of the cutting mechanism 315 may vary widely. For example, while the shape of a semicircle or curve of cutting mechanism 315 may be selected to engage a particular, e.g., substantially optimal, amount of a road surface 110, the cutting mechanism 315 may have a shape other than a semicircle, e.g., a minor arc shape, a major arc shape, an ovular shape, an elliptical shape, a pointed arch shape, a "u" shape, a "v" shape, a rectangular shape, or another shape.

In addition, the cutting mechanism 315 may have a size smaller than approximately one meter or larger than approximately 1.5 meters and a depth smaller than approximately 3 inches or larger than approximately 6 inches. A stopping potential for the rapid deceleration mechanism 105 may be correlated to a size and/or depth of the cutting mechanism 315. For example, a blade 507 with a larger cutting surface area may facilitate creating a stronger anchor to decelerate a vehicle 100 than may be provided by a blade 507 with a smaller cutting surface area. As would be recognized by a person of skill in the art, different configurations may provide different anchor strengths, and correspondingly may achieve different stopping potentials, depending on a variety of factors, including, e.g., a size/weight of the vehicle 100 and a type and thickness of the road surface 110.

Figure 8:
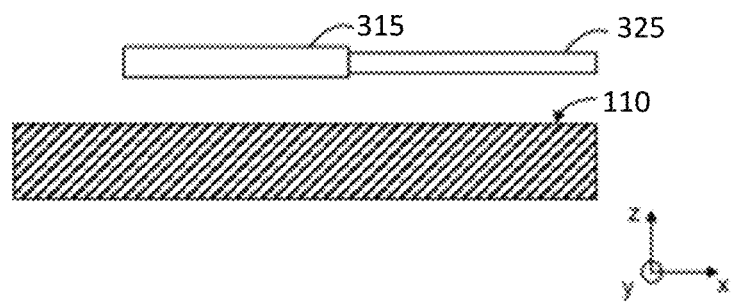
FIG. 8 is a side view of a cutting mechanism and a tether of a rapid deceleration mechanism in an undeployed state, according to an example embodiment.
Figure 9:
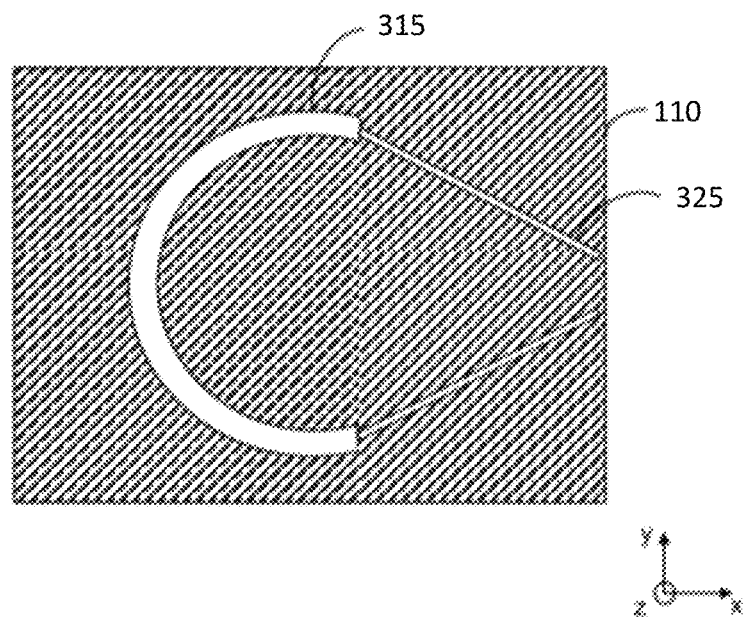
FIG. 9 is a top view of a cutting mechanism and a tether of a rapid deceleration mechanism in an undeployed state, according to an example embodiment.

Example features of the cutting mechanism 315 and tether 325 in undeployed and deployed states are now described with reference to FIGS. 8-11. FIGS. 8 and 9 respectively illustrate a side view and a top view of the cutting mechanism 315 and tether 325 in an undeployed state, while FIGS. 10 and 11 respectively illustrate a side view and top view of the cutting mechanism 315 and tether 325 in a deployed state. As described above, the cutting mechanism 315 and tether 325 may be mounted to, or integrated with, a vehicle, e.g., the vehicle 100, as part of a rapid deceleration mechanism of the vehicle. For example, the cutting mechanism 315 and tether 325 shown in the undeployed state of FIGS. 8 and 9 may generally correspond to the vehicle with the rapid deceleration mechanism undeployed as shown in FIGS. 1 and 2, and the cutting mechanism 315 and tether 325 shown in the deployed state of FIGS. 10 and 11 may generally correspond to the vehicle with the rapid deceleration mechanism deployed as shown in FIG. 3. An overall rapid deceleration mechanism and a vehicle are not shown in FIGS. 8-11 for ease of illustration.

As shown in FIGS. 8 and 9, when in an undeployed state, such as a regular operating mode of travel or parked state, the cutting mechanism 315 and tether 325 are positioned substantially over a road surface, e.g., road surface 110, with respect to a z-axis, at a time t1. Although the cutting mechanism 315 and tether 325 are shown in FIGS. 8 and 9 as coplanar (relative to the z-axis), in line with one another, and parallel to the road surface 110, this positioning is illustrative and should not be construed as being limiting in any way. For example, the cutting mechanism 315 and/or tether 325 may be noncoplanar and/or each or both of the cutting mechanism 315 and tether 325 can be disposed at a non-zero angle (e.g., an acute or obtuse angle) relative to the road surface 110.

Figure 10:
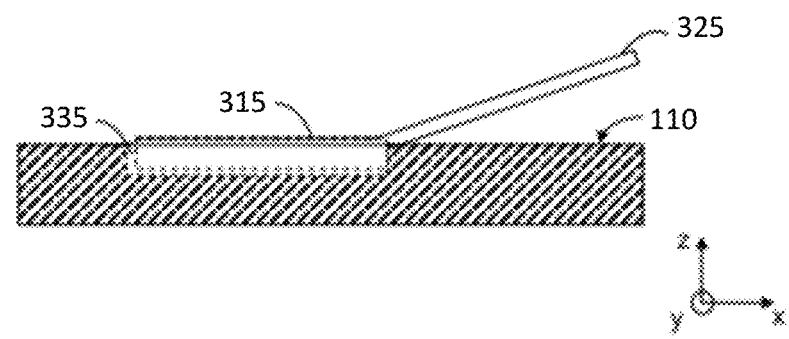
FIG. 10 is a side view of a cutting mechanism and a tether of a rapid deceleration mechanism in a deployed state, according to an example embodiment.
Figure 11:
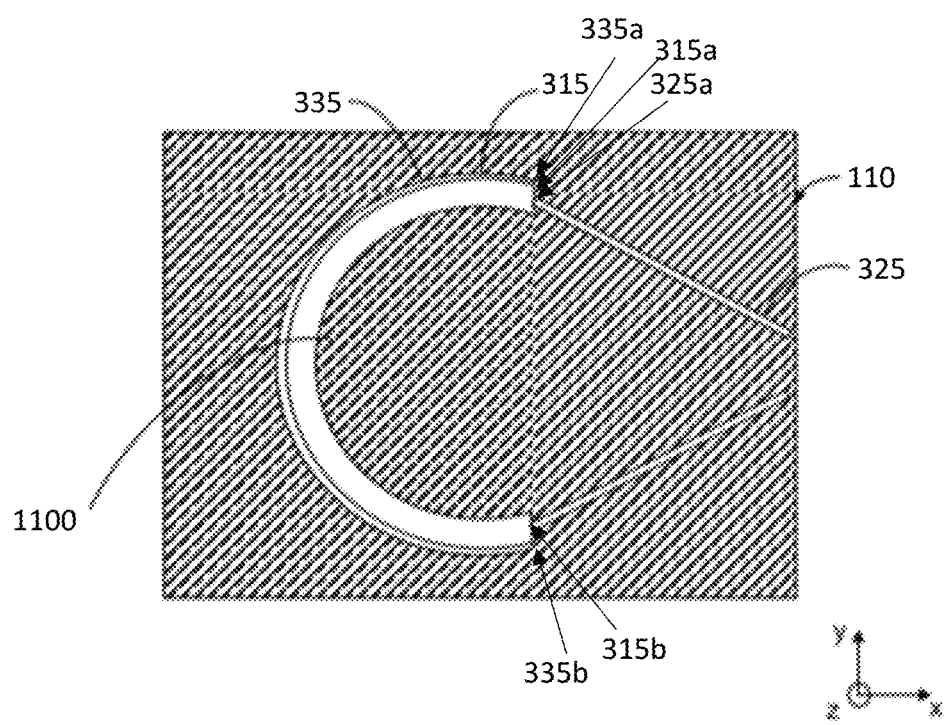
FIG. 11 is a top view of a cutting mechanism and a tether of a rapid deceleration mechanism in a deployed state, according to an example embodiment.

As shown in FIGS. 10 and 11, when in a deployed state, e.g., when the rapid deceleration mechanism has been deployed to rapidly decelerate the vehicle, at least a portion of the cutting mechanism 315 and/or at least a portion of the proximal end 325a of the tether 325 are disposed within a channel 335 that has been created in the road surface 110 by the cutting mechanism 315 (e.g., via the blade 507 of the cutting mechanism 315). For example, at a time t2, which is after time t1, the cutting mechanism 315 can cut into or otherwise break through the road surface 110 to create the channel 335, which may generally define, e.g., a ditch or a divot within the road surface 110. The cutting mechanism 315 remains substantially disposed at least partially within the channel 335 such that the cutting mechanism 315 and the tether 325 coupled thereto—and the vehicle coupled to the tether 325—are effectively anchored to the road surface 110.

In an example embodiment, at least a portion of the proximal end 325a of the tether 325 also is disposed at least partially within the channel 335. For example, as described above with reference to FIGS. 6 and 7, the proximal end 325a of the tether 325 may pass through an opening in the cutting mechanism such that, when the cutting mechanism 315 is disposed at least partially in the channel 335, the proximal end 325a of the tether 325 is also disposed at least partially in the channel 335. In addition to being arranged to cut through the road surface 110, for example, the cutting mechanism 315 may also serve as a sleeve or a housing in which the proximal end 325a of the tether 325 may be partially contained.

As best seen in FIG. 11, the channel 335 may have substantially the same general shape as the cutting mechanism 315, e.g., a semicircular shape. The channel 335 may define a bollard area 1100 against which the cutting mechanism 315 and tether 325 are anchored. In an example embodiment, the bollard area 1100 extends substantially between opposing ends 315a, 315b of the cutting mechanism 315 and, correspondingly, opposing ends 335a, 335b of the channel 335. For example, the cutting mechanism 315 and tether 325 can be anchored against the bollard area 1100, with the cutting mechanism 315 and/or tether 325 at least partially disposed within the channel 335, when a force at least partially in a direction along an x-axis is applied to the cutting mechanism 315 and tether 325. It should be appreciated that a direction of travel of a vehicle may generally include a component along the x-axis.

As described above, the shape and size of the cutting mechanism 315 may vary widely. For example, the cutting mechanism 315 may have a shape other than a semicircle, e.g., a minor arc shape, a major arc shape, an ovular shape, an elliptical shape, a pointed arch shape, a "u" shape, a "v" shape, a rectangular shape, or another shape. In addition, the cutting mechanism 315 may have any size, provided that a stopping potential for the rapid deceleration mechanism may be correlated to a size of the cutting mechanism 315. For example, a larger cutting mechanism 315 may facilitate creating a larger channel 335, which in turn would facilitate creating a larger bollard area 1100. A larger bollard area 1100 may provide a larger amount of road surface material into which a force may be distributed, thereby resulting in a stronger anchor/bond between the vehicle and the road surface 110.

Although the cutting mechanism 315 is shown in FIGS. 10 and 11 as parallel and in line with the road surface 110 (relative to the z-axis), this positioning is illustrative and should not be construed as being limiting in any way. For example, the cutting mechanism 315 may be disposed at a non-zero angle (e.g., an acute or obtuse angle) relative to the road surface 110 such that at least a portion of the cutting mechanism 315, e.g., a blade edge 507a (as shown in FIGS. 6 and 7) is disposed both on the sides of the bollard area 1100 and beneath a portion of the bollard area 1100. Similarly, a grind of the blade 507 may provide for an angled or sloped profile, which facilitates a positioning of at least a portion of the blade 507 beneath the bollard area 1100.

Figure 12:
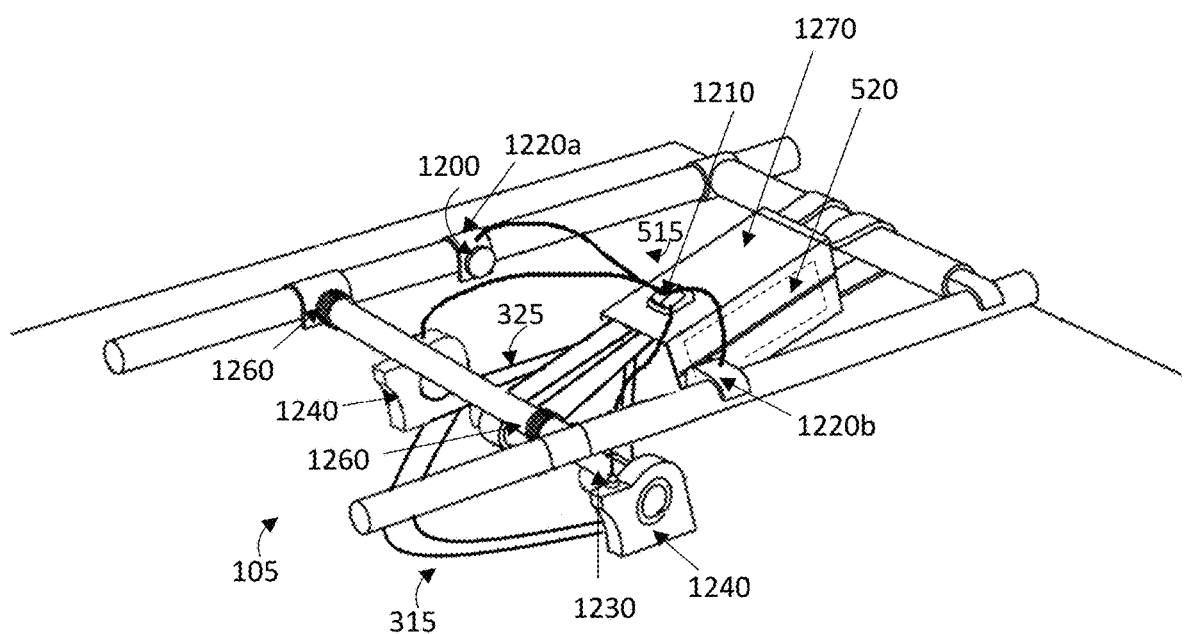
FIG. 12 is a perspective side view of a rapid deceleration mechanism with portions thereof removed for clarity, according to an example embodiment.
Figure 13:
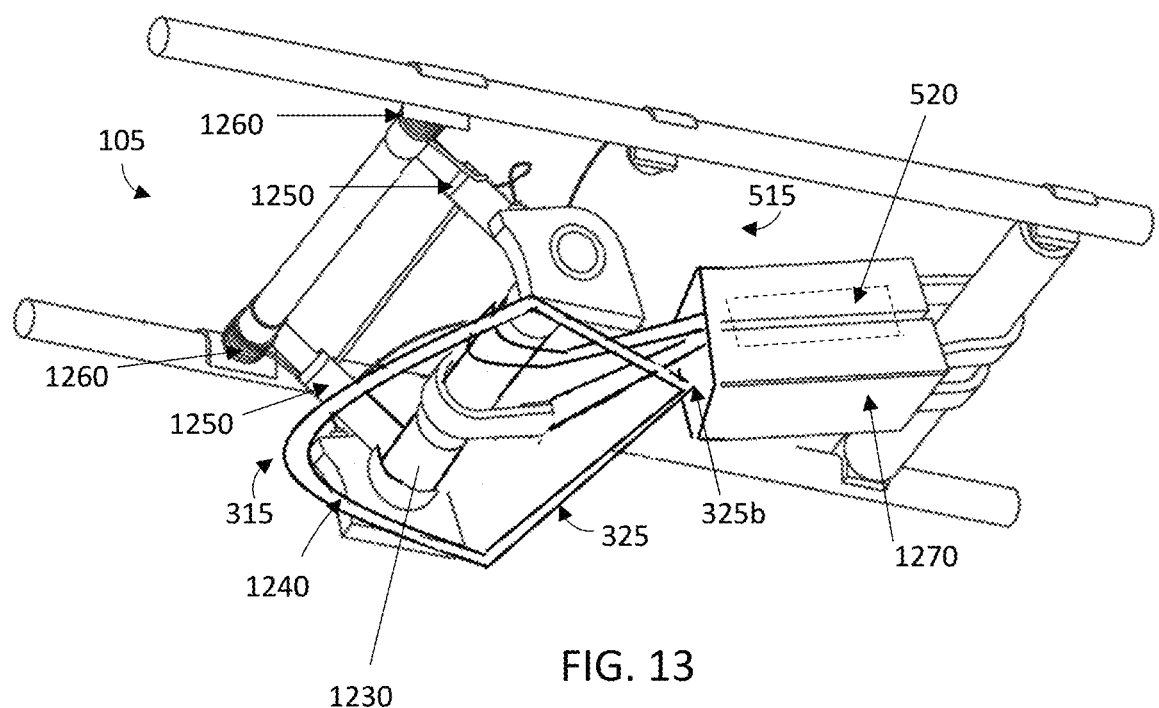
FIG. 13 is a perspective bottom view of a rapid deceleration mechanism with portions thereof removed for clarity, according to an example embodiment.

Turning now to FIGS. 12 and 13, an example of actuating mechanism 515 is described in more detail. For example, the actuating mechanism 515 may be mounted to, or integrated with, a vehicle, e.g., the vehicle 100, as part of a rapid deceleration mechanism 105 of the vehicle. An overall rapid deceleration mechanism and a vehicle are not shown in FIGS. 12 and 13 for ease of illustration.

The actuating mechanism 515 includes a release mechanism 1200 for selectively deploying the cutting mechanism 315. For example, the release mechanism 1200 may include a detonator control box 1210 in electric communication (e.g., via wires or wireless) with a control system (e.g., the control system 435 shown in FIG. 4) of the vehicle and one or more couplers 1220a and 1220b of the vehicle. The couplers 1220a and 1220b can support explosive material (e.g., chemical energy such as nitroglycerin or grain dues, pressurized gas such as gas cylinder or aerosol can, and/or nuclear energy such as fissile isotope uranium-235 or plutonium-239) that can be selectively activated by the control system (by an electrical signal transmitted from the control system to the detonator control box 1210) to release sufficient explosive energy to at least partially release the cutting mechanism 315.

For example, the couplers 1220a and 1220b can detach an axle 1230 to which one or more powered drivers 1240 and telescoping devices 1250 are coupled, thereby causing the telescoping devices 1250 to extend, and the axle 1230 and powered drivers 1240 to move, away from the vehicle and towards a road surface on which the vehicle is traveling (e.g., road surface 110). This movement of the axle 1230 and/or powered drivers 1240 can in turn cause the cutting mechanism 315 to move towards the road surface. For example, the powered drivers 1240 and/or axle 1230 can be coupled to, or pressed against, the cutting mechanism 315 such the movement of the axle 1230 and/or powered drivers 1240 moves the cutting mechanism 315 downward, towards the road surface.

In an example embodiment, the powered drivers 1240, telescoping devices 1250, and/or one or more other biasing elements may forcefully drive the cutting mechanism 315 downward. For example, one or more double torsion springs 1260 may forcefully bias the telescoping devices 1250 towards the cutting mechanism 315 to thereby forcefully bias the cutting mechanism 315 towards the road surface.

In an example embodiment, the energy absorbing mechanism 520 can be coupled to the tether 325 and configured to dissipate certain energy, e.g., kinetic energy, that is generated when the cutting mechanism 315 is deployed. For example, as described above in connection with FIG. 4, the energy absorbing mechanism 520 can include one or more hydraulic shocks, disc brakes, dampers, springs, shape memory material (e.g., nitinol), dashpots, and/or other structures that are designed to absorb shock loads, e.g., via collapsing, crumpling, and/or expanding. In the example embodiment shown in FIGS. 12 and 13, the energy absorbing mechanism 520 is disposed within a housing 1270 to which, or within which, the distal end 325b of the tether 325 is coupled.

As would be appreciated by a person of ordinary skill in the art, the locations and configuration of the components shown in FIGS. 12 and 13 are illustrative and should not be construed as being limiting in any way. For example, alternative mechanisms for releasing, propelling, or otherwise causing the cutting mechanism 315 to move would be readily apparent to a person of skill in the art. In one alternative example embodiment, for example, the axle 1230 may be selectively released via one or more mechanical or electromechanical mechanisms, such as a solenoid lock, a mechanical spring lock, or a magnetic lock, or by breaking or severing a fastener, e.g., via a movable knife. In addition, one or more powered drivers 1240 and/or telescoping devices 1250 may be configured to bias the cutting mechanism 315 without the presence or release of an axle 1230. As would be appreciated by a person of skill in the art, the force with which the actuating mechanism 515 may cause the cutting mechanism 315 to move towards the road surface may vary depending on the requirements of the particular vehicle.

Figure 14:
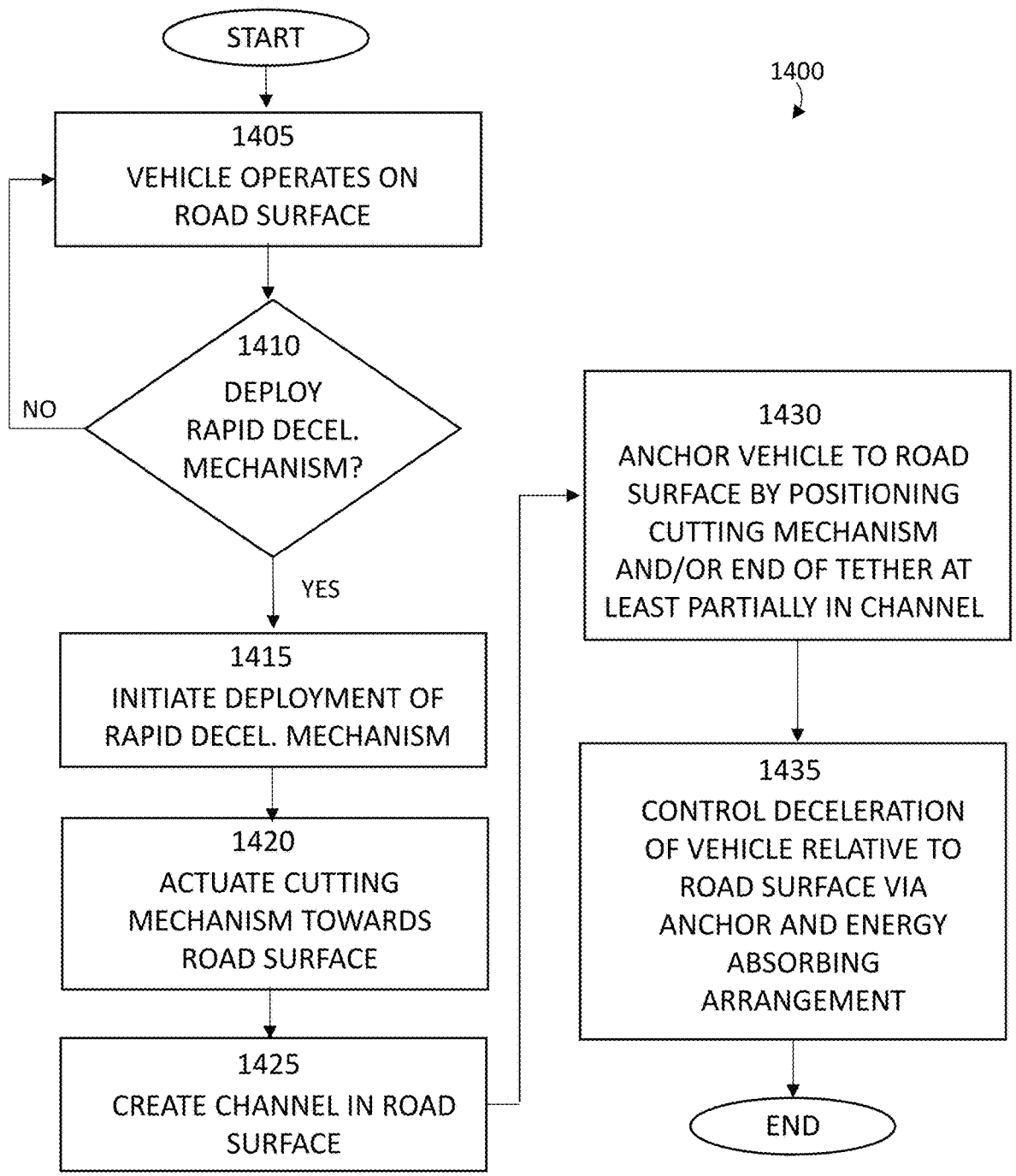
FIG. 14 is a process flow diagram illustrating a method of decelerating a vehicle, according to an example embodiment.

FIG. 14 is a process flow diagram illustrating a method 1400 of decelerating a vehicle, such as the vehicle 100, according to an example embodiment. The method 1400 begins in step 1405 in which the vehicle operates on a road surface, such as the road surface 110. For example, the vehicle may be driving on the road surface in a first direction (e.g., direction 150 shown in FIG. 1). Various steps of the method 1400 may be performed by one or more components of the vehicle 100, depicted in FIG. 4, as well as components of the rapid deceleration mechanism 105 depicted in the figures described above.

In step 1410, a determination is made regarding whether to deploy a rapid deceleration mechanism to rapidly decelerate the vehicle. In an example embodiment, a control system of the vehicle may determine to deploy the rapid deceleration mechanism upon a determination that a braking system of the vehicle is inadequate to achieve a desired deceleration. For example, the rapid deceleration mechanism may be deployed if a collision is perceived to be imminent (e.g., based on data from a sensor system of the vehicle and/or from an external system communicating with the vehicle) and it is determined that the braking system is inadequate to avoid the collision. The determination in step 1410 may include consideration of a number of factors, including, for example, a speed at which the vehicle is traveling; a current distance between the vehicle and an anticipated location of a hazard, such as a collision with an obstacle; and/or a speed at which an obstacle is traveling.

If it is determined in step 1410 not to deploy the rapid deceleration mechanism, then the method 1400 returns to step 1405 in which the vehicle continues to operate on the road surface. Alternatively, if it is determined in step 1410 to deploy the rapid deceleration mechanism, then the method 1400 continues to step 1415 in which deployment of the rapid deceleration mechanism is initiated. For example, the control system in cooperation with the processor may send an instruction to a propulsion system of the vehicle to cause the propulsion system to initiate deployment of the rapid deceleration mechanism. The rapid deceleration mechanism may be deployed in lieu of, or in addition to, deploying a regular (e.g., primary) braking system of the vehicle, e.g., based on relative or total deceleration capabilities of the braking system and rapid deceleration mechanism as compared to a desired amount of deceleration.

In an example embodiment, initiating deployment of the rapid deceleration mechanism includes sending an instruction, e.g., via the processor and/or control system, to engage an actuating mechanism of the rapid deceleration mechanism. For example, the control system in cooperation with the processor may send the instruction to the propulsion system of the vehicle, which includes the actuating mechanism. In step 1420, the actuating mechanism causes the cutting mechanism to be actuated (e.g., released or propelled) towards the road surface. As discussed above with reference to FIGS. 12 and 13, the actuating mechanism may include one or more powered drivers, pyrotechnic telescoping devices, or other mechanisms, which may be selectively activated to cause the cutting mechanism to be propelled toward the road surface.

In step 1425, the cutting mechanism, which has been actuated towards the road surface, cuts into the road surface such that a channel (e.g., a ditch or a divot) is created in the road surface. For example, the cutting mechanism can accelerate into the road surface, breaking through the road surface by cutting, shattering, compressing, and/or cracking the surface. In an example embodiment, a blade edge of the cutting mechanism may make initial contact with the road surface such that an entire edge or portion thereof breaks through the road surface. For example, a blade having a substantially semi-circular shape, as illustrated in FIGS. 6-11, may have a blade edge with a grind and profile such that an entire edge length or portion of the edge length breaks through the road surface.

Once the cutting mechanism creates the channel in step 1425, the vehicle is anchored to the road surface in step 1430 when at least a portion of the cutting mechanism, including at least a portion of the blade edge, and/or at least a portion of an end of a tether associated with the cutting mechanism, is positioned within the channel. In other words, the cutting mechanism and tether define a bollard anchor, which effectively anchors the vehicle to the road surface. For example, as described above in connection with FIGS. 6-11, an end of the tether may be coupled and/or formed with the cutting mechanism such that both a portion of the cutting mechanism and a portion of the end of the tether are positioned at least partially in the channel.

In step 1435, an energy absorbing mechanism of the rapid deceleration mechanism cooperates with the cutting mechanism to control deceleration of the body of the vehicle relative to the road surface (and bollard anchor), e.g., to bring the vehicle to a controlled stop. For example, the energy absorbing mechanism can include one or more hydraulic shocks, disc brakes, dampers, springs, shape memory material (e.g., nitinol), dashpots, and/or other structures that are designed to absorb shock loads, e.g., via collapsing, crumpling, and/or expanding, to control the rate of deceleration of the vehicle. As would be appreciated by a person of ordinary skill in the art, the rate of deceleration of the vehicle may be adjusted, e.g., by adjusting a length or material type of the tether and/or by adjusting a length, strength, material type, or other applicable feature of the energy absorbing mechanism.

As would be recognized by a person of skill in the art, the steps associated with the methods of the present disclosure, including method 1400, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Certain example embodiments may be implemented as hardware, firmware, and/or software logic embodied in a tangible, i.e., non-transitory, medium that, when executed, is operable to perform the various methods and processes described above. That is the logic may be embodied as physical arrangements, modules, or components. For example, the systems of a vehicle, as described above with reference to FIG. 4, may include hardware, firmware, and/or software embodied on a tangible medium. The components and programs described herein are identified based upon the application for which they are implemented in a specific embodiment. However, it should be appreciated that any particular component/program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method for rapidly decelerating a vehicle includes creating a channel in a road surface on which the vehicle is driving by actuating a cutting mechanism coupled to a body of the vehicle towards the road surface. The channel defines a bollard area in the road surface. The body of the vehicle is anchored relative to the road surface by positioning at least a portion of the cutting mechanism at least partially within the channel, against the bollard area. For example, when the vehicle is driving in a first direction, the vehicle may be decelerated by restricting movement of the cutting mechanism relative to the bollard area in the first direction. Force resulting from decelerating the vehicle may be transferred to one or more of the bollard area or an energy absorbing mechanism of the vehicle.

For example, creating the channel can be responsive to a determination that a braking system of the vehicle is inadequate to complete a desired deceleration. Creating the channel could comprise, for example, creating the channel such that a cross-section shape of the channel is substantially similar to a cross-sectional shape of the cutting mechanism. For example, the cross-sectional shape of the channel may be curved, and the bollard area may extend substantially between opposing ends of the channel. Anchoring the body of the vehicle relative to the road surface also could include positioning at least a portion of an end of a tether within the channel, the cutting mechanism being coupled to the body of the vehicle via the tether.

In another form, an apparatus for rapid deceleration includes a cutting mechanism configured to be coupled to a body of a vehicle. An actuating mechanism is configured to selectively actuate the cutting mechanism towards a road surface on which the vehicle is driving to cause the cutting mechanism to cut a channel in the road surface. The channel defines a bollard area in the road surface. At least a portion of the cutting mechanism is disposed at least partially within the channel, against the bollard area, to anchor the body of the vehicle relative to the road surface In another form, a vehicle includes a body and a rapid deceleration mechanism configured to decelerate the body traveling on a road service. The rapid deceleration mechanism includes a cutting mechanism, a tether coupling the cutting mechanism to the body, and an actuating mechanism configured to selectively actuate the cutting mechanism towards the road surface to cause the cutting mechanism to cut a channel in the road surface, wherein the channel defines a bollard area and at least a portion of the cutting mechanism is disposed at least partially within the channel, against the bollard area, to anchor the body relative to the road surface.

The descriptions of the various example embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   creating a channel in a road surface on which a vehicle is driving by actuating a cutting mechanism coupled to a body of the vehicle towards the road surface, the channel defining a bollard area in the road surface that forms a curve between opposing ends of the cutting mechanism; and
   anchoring the body of the vehicle relative to the road surface by positioning at least a portion of the cutting mechanism at least partially within the channel, against the bollard area.

2. The method of claim 1, wherein the vehicle is driving in a first direction, and wherein the method further comprises decelerating the vehicle by restricting movement of the cutting mechanism relative to the bollard area in the first direction.

3. The method of claim 2, wherein decelerating the vehicle further comprises transferring force resulting from decelerating the vehicle to one or more of the bollard area or an energy absorbing mechanism of the vehicle.

4. The method of claim 1, wherein creating the channel is responsive to a determination that a braking system of the vehicle is inadequate to complete a desired deceleration.

5. The method of claim 1, wherein creating the channel comprises creating the channel such that a cross-sectional shape of the channel is substantially similar to a cross-sectional shape of the cutting mechanism.

6. The method of claim 5, wherein the cross-sectional shape of the channel is curved, and wherein the bollard area extends substantially between opposing ends of the channel.

7. The method of claim 1, wherein anchoring the body of the vehicle relative to the road surface further comprises positioning at least a portion of an end of a tether within the channel, the cutting mechanism being coupled to the body of the vehicle via the tether.

8. A system comprising:
   a cutting mechanism;
   a tether configured to couple the cutting mechanism to a body of a vehicle; and
   an actuating mechanism configured to selectively propel the cutting mechanism towards a road surface on which the vehicle is driving to cause the cutting mechanism to cut a channel in the road surface, wherein the channel defines an anchor area in a form of a bollard that extends substantially between opposing ends of the channel, and wherein at least a portion of the cutting mechanism is disposed at least partially within the channel to anchor the body of the vehicle relative to the road surface and at least a portion of an end of the tether is disposed within the channel,
   wherein the cutting mechanism is configured to create a cross-sectional shape of the channel that is substantially similar to a cross-sectional shape of the cutting mechanism and the cross-sectional shape of the channel is curved.

9. The system of claim 8, wherein the cutting mechanism defines an opening within which the end of the tether is disposed.

10. The system of claim 8, wherein the tether is pivotable relative to the cutting mechanism.

11. The system of claim 8, further comprising an energy absorbing mechanism configured to dissipate energy that is generated when the body of the vehicle is anchored relative to the road surface, wherein the energy absorbing mechanism is configured to collapse to anchor the body of the vehicle.

12. The system of claim 8, wherein the actuating mechanism is configured to propel the cutting mechanism towards the road surface in response to a determination that a braking system of the vehicle is inadequate to achieve a desired deceleration.

13. The system of claim 8, further comprising:
   at least one powered driver that forcefully drives the cutting mechanism downwards toward the road surface.

14. A vehicle comprising:
   a body; and
   a rapid deceleration mechanism configured to decelerate the body traveling on a road surface, the rapid deceleration mechanism comprising:
   a cutting mechanism,
   a tether coupling the cutting mechanism to the body, and
   an actuating mechanism configured to selectively propel the cutting mechanism towards the road surface to cause the cutting mechanism to cut a channel in the road surface, wherein at least a portion of the cutting mechanism and at least a portion of an end of the tether are disposed at least partially within the channel to anchor the body relative to the road surface, wherein the cutting mechanism defines an opening within which the end of the tether is disposed.

15. The vehicle of claim 14, further comprising a braking system, wherein the actuating mechanism is configured to propel the cutting mechanism towards the road surface in response to a determination that the braking system is inadequate to achieve a desired deceleration.

16. The vehicle of claim 14, wherein the cutting mechanism is configured to create a cross-sectional shape of the channel that is substantially similar to a cross-sectional shape of the cutting mechanism.

17. The vehicle of claim 16, wherein the cross-sectional shape of the channel is curved.

18. The vehicle of claim 14, wherein the tether is pivotable relative to the cutting mechanism.

19. The vehicle of claim 14, further comprising:
at least one powered driver that forcefully drives the cutting mechanism downwards toward the road surface.

20. The vehicle of claim 16, wherein the channel defines an anchor area in a form of a bollard that extends substantially between opposing ends of the channel.

* * * * *